United States Patent [19]

Rodloff et al.

[11] Patent Number: 4,650,331

[45] Date of Patent: Mar. 17, 1987

[54] ROTATIONAL VIBRATION DRIVE FOR A RING LASER GYROSCOPE

[75] Inventors: Rüdiger K. Rodloff, Meinersen; Werner W. Jungbluth, Königslutter; Dieter H. Laschinski, Braunschweig, all of Fed. Rep. of Germany

[73] Assignee: Deutsch Forschungs- und Versuchsanstalt fur Luft- und Raumfahrt e.V., Cologne, Fed. Rep. of Germany

[21] Appl. No.: 724,087

[22] Filed: Apr. 17, 1985

[30] Foreign Application Priority Data

Apr. 21, 1984 [DE] Fed. Rep. of Germany ....... 3415220

[51] Int. Cl.$^4$ ............................................... G01B 9/02
[52] U.S. Cl. .................................................... 356/350
[58] Field of Search .......................................... 356/350

[56] References Cited

U.S. PATENT DOCUMENTS 3,373,650  3/1968  Killpatrick ........................... 356/350

FOREIGN PATENT DOCUMENTS 3224229  1/1983  Fed. Rep. of Germany .
3234078  3/1983  Fed. Rep. of Germany .
3150160  6/1983  Fed. Rep. of Germany .

Primary Examiner—Eugene R. LaRoche
Assistant Examiner—David Mis
Attorney, Agent, or Firm—Salter & Michaelson

[57] ABSTRACT

The rotational vibration drive consists of a first plate attachable to a fixed baseplate and a second plate attachable to a clamping plate for the ring laser block. The first and second plates are arranged side by side in the same plane. A torsionally stiff rotational spring linkage joins the first and second plates and has a rotational axis perpendicular to the plane of the beam path of the ring laser. The first and the second plates together with the rotational spring linkage are of unitary construction. Two slots originating from the rotational spring linkage extend between the first and the second plates. A piezoceramic stack drive is arranged in mutually-aligned holes in the first and second plates and acts between the said first and second plates, the axis of the piezoceramic stack drive being positioned centrally in height between surfaces of the first and second plates.

13 Claims, 7 Drawing Figures

ROTATIONAL VIBRATION DRIVE FOR A RING LASER GYROSCOPE

FIELD OF THE INVENTION

The invention concerns a rotational vibration drive for a ring laser gyroscope having a ring laser block, the rotational vibration drive being of the kind having a spring arrangement between a fixed baseplate and a clamping plate for the ring laser block and a piezoceramic stack drive which is operative in an expansion mode.

DESCRIPTION OF THE PRIOR ART

In a known rotational vibration drive of the above-mentioned kind (DE-OS 31 50 160) there is a spring arrangement having radial arms which are concentric towards the center point and which extend between a central plate attachable to a base plate and a clamping plate for the ring laser block. On the outside of the clamping plate there is an end stop shoulder which extends radially and against which one end of an expansion mode piezoceramic stack drive, i.e., one which is contacted in the 33 direction, abuts, the other end of the stack drive being supported against an end stop on the baseplate. A rotational vibration drive of this kind is difficult to manufacture. Because of the elasticity, tumbling movements of the oscillation axis of the ring laser block, which have a negative influence on the resulting measurement of a ring laser gyroscope, are unavoidable with a rotational vibration drive of this kind, as a result of the relatively large lever arm against which the piezoceramic stack drive acts and the required deflection of force through the baseplate.

A rotational vibration drive for a ring laser gyroscope in which the ring laser block is carried on three radial leaf springs which extend from their attachment points on the ring laser block towards the rotation axis and are fastened by that end to the baseplate is also known (U.S. Pat. No. 3,373,650). A magnetic vibration drive is provided between one of the attachment points on the ring laser and the fixed baseplate.

Such an arrangement has a particular tendency to tumbling movements of the rotation axis of the ring laser block.

The object of the invention is to design a rotational vibration drive of the aforesaid kind in such a way that tumbling movements of the rotation axis are avoided with great certainty, while at the same time imposing requirements on its manufacture which are considerably less severe than in the case of the known rotational vibration drives.

SUMMARY OF THE INVENTION

The object is solved according to the invention by a rotational vibration drive of the aforesaid kind in which:

the rotational vibration drive comprises a first plate attachable to said fixed baseplate and a second plate attachable to said clamping plate for said ring laser block, said first and second plates arranged side by side in the same plane;

said spring arrangement is designed as a torsionally stiff rotational spring linkage joining said first and second plates with a rotational axis perpendicular to the plane of the beam path of said ring laser;

said first and said second plates together with said rotational spring linkage are of unitary construction;

two slots originating from said rotational spring linkage run between said first and said second plates;

said piezoceramic stack drive is arranged in mutually-aligned holes in said first and said second plates and acts between said first and said second plates, and;

the axis of said piezoceramic stack drive is positioned centrally in height between surfaces of said first and said second plates.

One embodiment of a reaction-free rotational vibration drive of the aforesaid kind in accordance with the invention is one in which:

the rotational vibration drive comprises a first plate attachable to said fixed baseplate; a second plate attachable to said clamping plate for said ring laser block and a third plate acting as a counterweight, said second and third plates arranged one above the other on said first plate;

said spring arrangement is designed as torsionally stiff rotational spring linkages, aligned with each other, joining said second and third plates respectively to said first plate, with rotational axes perpendicular to the plane of the beampath of said ring laser;

said first, second and third plates together with said rotational spring linkages are of unitary construction;

two slots originating from each of said rotational spring linkages run between said first and said second plates and between said first and said third plates;

one said piezoceramic stack drive is arranged in each of mutually-aligned holes in said first and said second plates and in said first and said third plates respectively and act between said first and said second plates and between said first and said third plates respectively, and the axes of said piezoceramic stack drives are each positioned centrally in height between essentially parallel surfaces of said first and said third plates respectively.

In either of these embodiments said rotational spring linkage may have concave cylindrical boundary surfaces on both sides with axes running parallel to the rotation axis. One of the slots may have a first section adjacent said rotational spring linkage and a second section running perpendicular to said first section. The slot may have a third section which merges with said second section and which runs parallel to said first section. The piezoceramic stack drive may be arranged with its axis parallel to a line joining the axes of the cylindrical boundary surface. One of the mutually-aligned holes may be a blind hole in one of the two plates.

In the second embodiment the third plate may include mountings for holding a supplementary mass.

BRIEF DESCRIPTION OF THE DRAWING

The invention is illustrated by way of example in the drawing and is described in detail below by reference to the drawing, in which.

DESCRIPTION OF THE PREFERRED EMBODIMENTS

Figure 1:
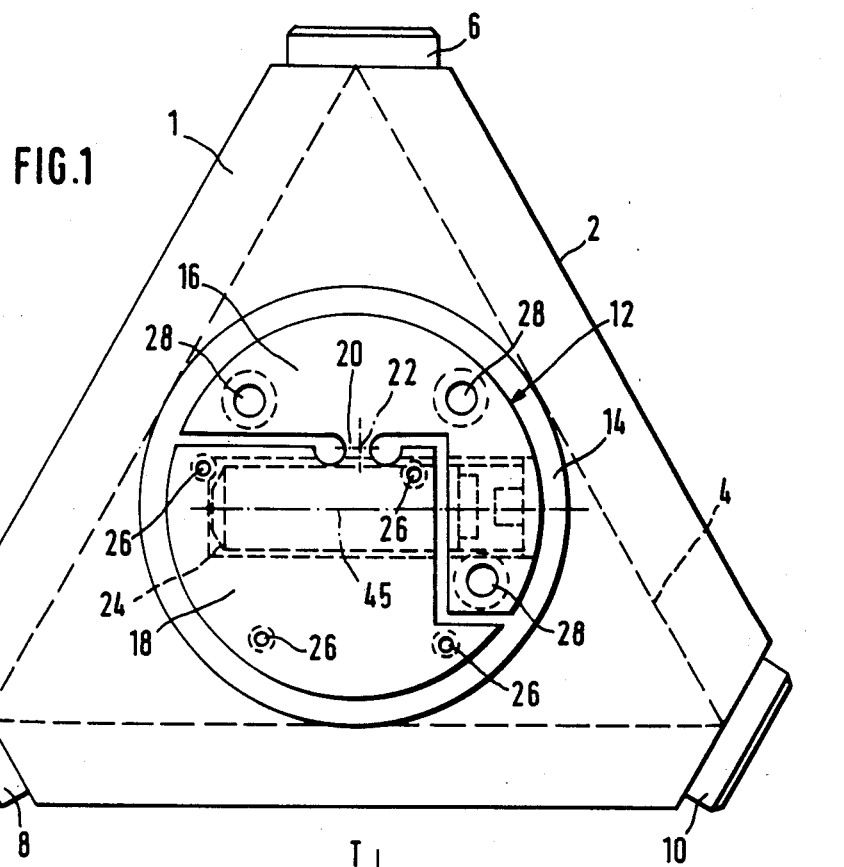
FIG. 1 shows diagrammatically the structure of a ring laser of a ring laser gyroscope having a rotational vibration drive according to the invention.

FIG. 1 illustrates the block 2 of a ring laser in which is formed the triangular path 4 along which the wave trains circulate in opposite directions, deflected by the three corner mirrors 6, 8 and 10. An active medium, not shown in the drawing, is provided in a known way to generate the laser radiation. The usual adjustments for the corner mirrors and means to couple out fractions of the radiation in order to determine the rotational velocity are not illustrated.

Onto the block 2 of the ring laser there is attached a rotational vibratory drive 12 which can be mounted, for example, on a disc 14 consisting of a metal that has substantially the same coefficient of expansion as the material from which the block 2 is made. The rotational vibratory drive 12 can also be fastened to the laser block in the usual way, however, using a clamping plate.

The rotational vibratory drive illustrated in FIG. 1 has two plates 16, 18 which are connected together by a rotational spring linkage 20. The rotational spring linkage, which has a virtual rotational axis 22, perpendicular to the plane of the radiation beam path 4, and two plates 16 and 18 are of unitary construction. A piezoceramic stack drive 24 is arranged as a vibration drive between the two plates 16 and 18 as will be described in detail hereinafter. Attachment to the clamping or fixing plate 14 and, thus to the block 2 of the ring laser, takes place via the tapped holes 26 in the plate 18. The screws with which the drive is fastened to a baseplate or the like are passed through the holes 28. The piezoceramic drive is equipped with a connection for a source of high voltage alternating electric current of medium frequency, preferably 400 Hz.

Further details will be described with reference to FIG. 3.

Figure 2:
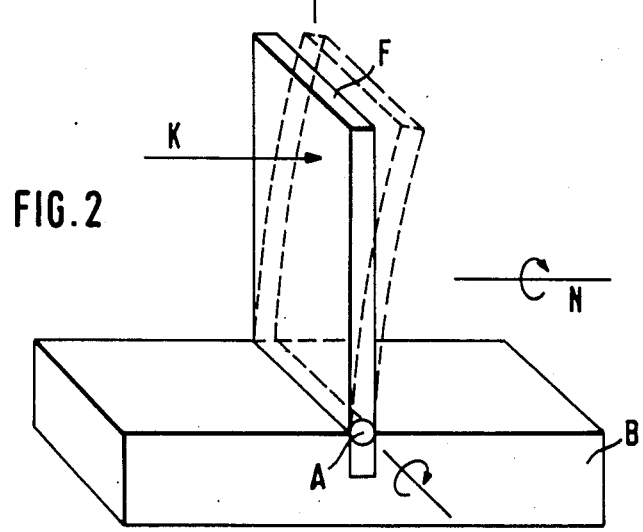
FIG. 2 shows diagrammatically the action of a rotational spring and the possible sources of error.

A ring laser gyroscope reacts only to rotational movements. It is therefore necessary to ensure that the rotational axis 22 of the rotational spring linkage extends perpendicular to the plane of the radiation beam path 4, even under the dynamic loads that arise. The action of a rotational spring with its movement possibilities, is illustrated diagrammatically in FIG. 2. Here the rotational spring is represented as a leaf spring F which is clamped at one end in a base B. The spring F is deflected about its axis of rotation A in a clockwise direction under the action of a force K, as the arrow indicates. The spring executes a purely rotational movement about the axis of rotation A, provided that the force K acts centrally on the spring.

The laser gyroscope output does not suffer any error in the output signal through the resulting translational movement between the two end positions, represented here in solid lines and in broken lines. If the force K acts eccentrically, a torsional movement of the spring around the axis T occurs, and simultaneously a pitching movement around the axis N. The torsional movement and the pitching movement must be eliminated by appropriate dimensioning of the spring, and also by the most symmetrically possible introduction of the force, so that only rotational movements about the vertical axis 22 occur, optionally with superimposed translational movements, while turning movements about more than one axis, i.e., tumbling movements, are avoided.

In the embodiment which is illustrated by way of example, the rotational vibration drive which is represented in FIG. 1 and which will be described in detail with reference to FIGS. 3 and 4 has a cylindrical outer periphery. The cross-sectional shape of the external profile can be designed differently to this, however.

In the embodiment, the rotational spring linkage 20 having a virtual perpendicular rotational axis 22 is bounded on both sides by concave cylindrical surrounding surfaces 30, 32 having axes extending parallel to the rotational axes. The spacing distance between these axes and the radius of the cylindrical boundary surfaces determine the width of the spring rotation linkage 20. In this embodiment the cylindrical boundary surfaces extend over 270°. The cylindrical boundary surface 30 is joined to a slot 34 which is continued to the outer circumference of the rotational vibration drive. The cylindrical boundary surface 32 is joined to a slot 36 with an initial section 38 which is aligned with the slot 34. Slot 38 merges at right angles into a second section 40 which in turn merges at right angles into a third section 42 which again leads to the outer periphery of the rotational vibration drive.

A cylindrical hole 44 which penetrates both of the plates and has the shape of a blind hole in plate 18 is provided and has an axis 45 which lies parallel to the line joining the axes of the cylindrical boundary surfaces 30, 32 and which is parallel to the slot 34 and the slot section 38. The hole 44 is constructed as a straight-through tapped hole 50 in the leg 48 of the plate 16 formed by the slot 36.

A piezoceramic drive 52, one end of which is supported against the base of the blind hole 46 via a central spherical bearing 54, is housed in the hole 44. A threaded plug 56, by which the piezoceramic drive element 52 is pressed under pre-stressing against the bottom of the blind hole 46, is screwed into the tapped hole 50.

Figures 3, 4:
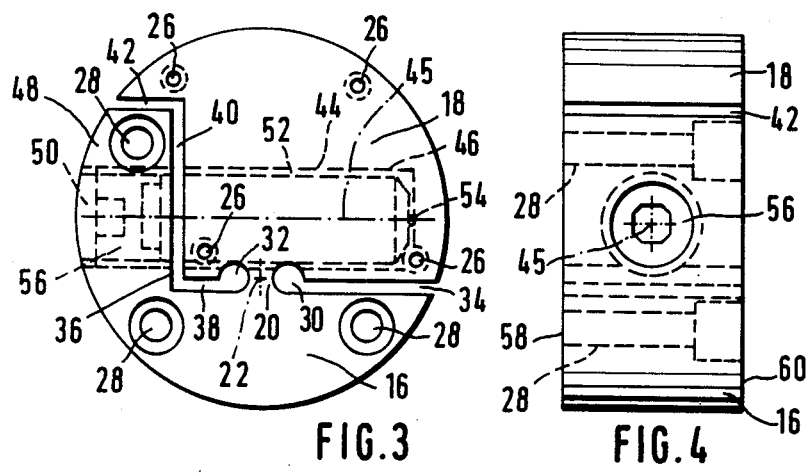
FIG. 3 shows a plan view of the rotational vibratory drive.
FIG. 4 shows a side view of the rotational vibratory drive of FIG. 3 as seen from the left.

As illustrated in FIG. 4, the axis 42 of the hole 44 is arranged centrally between the surfaces 58 and 60 of the two plates 16 and 18, which preferably lie parallel to one another. This ensures that the rotational spring linkage 20 is loaded centrally in the manner described hereinbefore, so that no torsional and pitching movements are initiated in the drive via the piezoceramic drive. Only very slight translational movements occur as a result of the construction of the rotational spring linkage as described, but they do not in any way exert a negative influence on the output signal, as indicated herein.

Torsional and pitching movements which could result from the elasticity of the clamping of the rotational vibration drive are largely avoided by the arrangement of the drilled holes 26 and 28 respectively at the points of a triangle, as in the embodiment described.

Figure 5:
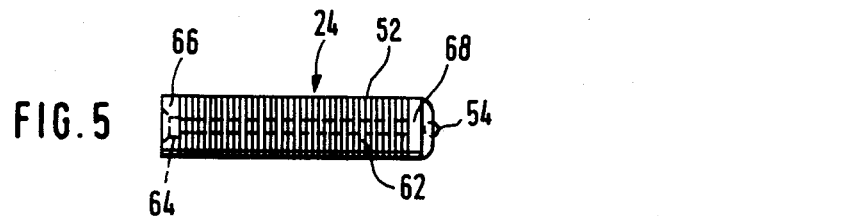
FIG. 5 shows a piezo drive in side view.

The piezoceramic drive is illustrated in FIG. 5. It consists of a stack of piezoceramic discs 62 which are contacted in the 33 direction, i.e., the discs 62 are expansion-mode discs, so that the polarization and the applied electric field are in the same direction and thus the maximum positioning force is developed. The discs 62 are arranged on a bolt 64 which is passed through a top disc 66 at one end and whose other end engages in a bottom disc 68 provided with an internal thread. This bottom disc is preferably equipped with the above-mentioned central spherical bearing 54. The stack of piezoceramic discs 62 receives its pre-stressing from the bolt 64. The conductive coatings of the piezoceramic discs are each connected to two electrical conductors, not shown, which are passed through the rotational vibration drive to the outside.

The piezoceramic drive 24 is connected to a high voltage alternating electric current of medium frequency, preferably one of 400 Hz. In this arrangement the piezoceramic drive generates a very high driving force, which is effective over only a very small distance for the individual discs. By the choice of the total number of piezoceramic discs, however, a sufficient movement amplitude can be generated. In this way, as a result of the smallest possible spacing distance between the center axis 45 of the piezoceramic drive 24 and the rotation axis 22, a sufficiently large oscillation amplitude can be achieved for the rotational vibration drive 12. At the same time the aforesaid high driving force, which is so large that any damping of the drive that may possibly occur during the operation cannot bring the latter to a standstill, is available over the entire amplitude.

The two plates 16 and 18 together with the rotation spring linkage joining them are made of hardenable steel. The spring linkage itself is loaded relatively lightly in the elastic region, so that a long operating lifetime is expected.

Figure 6:
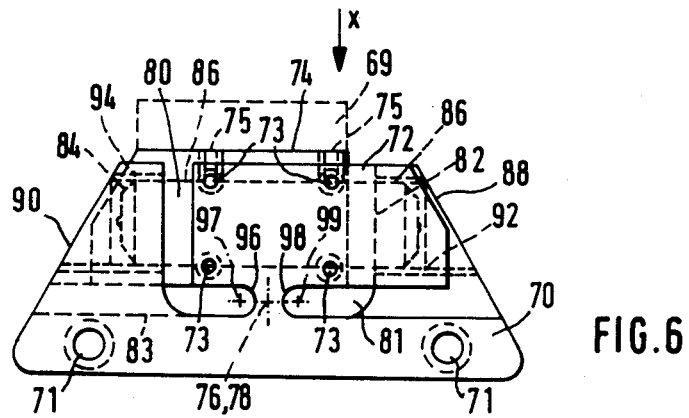
FIG. 6 shows a further embodiment of a rotational vibratory drive.
Figure 7:
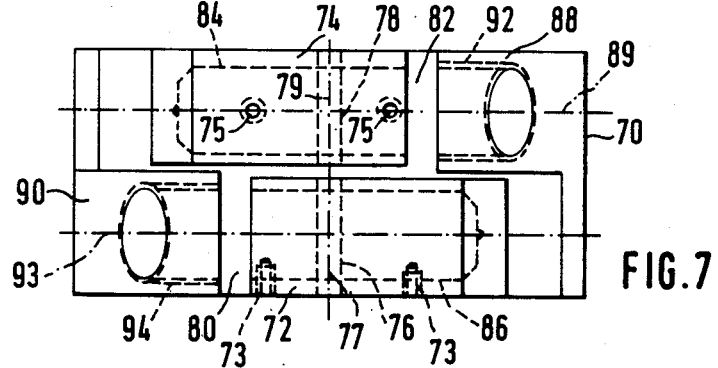
FIG. 7 shows a side view of the drive of FIG. 6 in the direction of the arrow X.

With the rotational drive described hereinbefore the reaction force must be absorbed by the baseplate. which must be constructed with an appropriate mass for this purpose. A reaction-free rotational vibration drive can be created by arranging two rotational vibration drives one above the other and oscillating in different directions. An embodiment of this kind, which in plan view is of trapezium shape is illustrated in FIGS. 6 and 7.

In this embodiment two plates 72, 74 namely a plate 72 for attaching the ring laser block and a plate 74 which constitutes a counterweight and/or to which a counterweight 69 can be attached, are arranged one above the other on a plate 70 which is fixed to the baseplate. The two plates 72 and 74 are linked to the plate 70 by rotational spring linkages 76, 78 which are coaxial or aligned, with rotational axes 75,77. Here again, the three plates 70, 72, 74 with the rotational spring linkages 76, 78 are of unitary construction.

The rotational spring linkages 76 and 78 are bounded, in the manner described hereinbefore, by two concave cylindrical boundary surfaces 96, 98 which extend here over 180° and which here again merge into slots 80, 81 and 82, 83 respectively, whereby the slots 80 and 82 are each L-shaped.

The piezoceramic stack drives 84, 86 are arranged with their axes 89, 93 parallel to the lines joining the axes 97, 99 of the two cylindrical boundary surfaces 96, 98 at the sides of the spring linkages 76, 78. As described hereinbefore, they each lie in blind holes in the two plates 72 and 74, which are aligned with tapped holes 92, 94 drilled in the bearing abutments 88, 90 each of which is constructed in the face of the plate 70 in front of the plates 72, 74. The stack drives are held under pre-stressing by threaded plugs not depicted in FIGS. 6 and 7. The axes 89, 93 of the drives are each positioned centrally in height between the surfaces of the plates 72 and 74 respectively.

The purpose of the drilled holes 71 is to fasten the plate 70 to the baseplate. The purpose of the tapped drilled holes 73 is to attach the holder for the ring laser block and the purpose of the tapped drilled holes 75 is to attach a counterweight mass 69, which is indicated by a broken line in FIG. 6.

In the arrangement described, the drives act in opposing directions. They are each fed with alternating current of the same phase.

Displacements of the components relative to one another and elastic deformations in the joints, which are unavoidable when the drives are assembled from several parts, are reliably avoided as a result of the unitary construction in the two embodiments of the vibration drive. As already mentioned herein, the drive has such a large drive force available that it can be operated even with a large amount of damping and outside of the resonance point. It is also possible to ensure by appropriate dimensioning of the spring linkage, that the intrinsic frequencies for torsional and pitching vibrations are very far removed from the drive frequency and thus cannot be excited.

What we claim as our invention and desire to secure by Letters Patent of the United States is:

1. In a rotational vibration drive for a ring laser gyroscope of a type including a ring laser block in which a beam path of said ring laser is defined, said drive including a first plate securable to a fixed base and a second plate securable to said ring laser block, spring means between said first and second plates and an expansion mode piezoceramic stack drive acting between said first and second plates, the improvement comprising said first and second plates being disposed in side-by-side substantially coplanar relation, said spring means comprising a torsionally stiff rotational spring linkage joining said first and second plates about a rotational axis which is perpendicular to the plane of the beam path of said ring laser, said first and second plates and said spring linkage being of unitary construction, said rotational vibration drive having first and second slots formed therein which extend outwardly from said spring linkage between said first and second plates, said first and second plates having aligned holes formed therein and each plate having upper and lower surfaces, said piezoceramic stack drive being disposed in said aligned holes and being operative along an axis which extends between said first and second plates and which is substantially centrally disposed between said upper and lower surfaces thereof.

2. A rotational vibration drive according to claim 1 in which said rotational spring linkage has concave cylindrical boundary surfaces on both sides thereof, the axes of said boundary surfaces running parallel to the rotation axis of said linkage.

3. A rotational vibration drive according to claim 2, in which the piezoceramic stack drive is arranged with its axis parallel to a line joining the axes of the cylindrical boundary surfaces.

4. A rotational vibration drive according to claim 1 in which one of said slots has a first section adjacent said rotational spring linkage and a second section running perpendicular to said first section.

5. A rotational vibration drive according to claim 4 in which said one of said slots has a third section which merges with said second section and which runs parallel to said first section.

6. A rotational vibration drive according to claim 1 in which one of the mutually-aligned holes is a blind hole in one of said two plates.

7. In a rotational vibration drive for a ring laser gyroscope of a type including a ring laser block in which a beam path of said ring laser is defined, said drive including a first plate securable to a fixed base, and a second plate securable to said ring laser block, spring means between said first and second plates and a pair of expansion-mode piezoceramic stack drives acting between said first and second plates, the improvement comprising said rotational vibration drive further comprising a third plate including a counterweight, said second and third plates being disposed one above another, said spring means comprising a pair of torsionally stiff spring linkages, said spring linkages independently joining said second and third plates to said first plate about aligned rotational axes which are perpendicular to the plane of the beam path of said ring laser, said first, second and third plates and said spring linkages being of unitary construction, said rotational vibration drive having first and second slots formed therein which extend between said first and second plates and third and fourth slots formed therein which extend between said first and third plates, said first and second plates and first and third plates having aligned holes formed therein, said first and third plates each having upper and lower surfaces, one of said piezoceramic stack drives being disposed in said aligned holes in said first and second plates and being substantially centrally disposed between the upper and lower surfaces of said first plate, the other of said piezoceramic stack drives being disposed in said aligned holes in said first and third plates and being substantially centrally disposed between the upper and lower surfaces of said third plate.

8. A rotational vibration drive according to claim 7 in which said rotational spring linkages have concave cylindrical boundary surfaces on both sides thereof with the axes of said boundary surfaces running parallel to the rotation axes of their respective spring linkages.

9. A rotational vibration drive according to claim 8 in which the piezoceramic stack drives are arranged with their axes parallel to lines joining the axes of the cylindrical boundary surfaces of their respective spring linkages.

10. A rotational vibration drive according to claim 7 in which one of said slots has a first section adjacent one of said rotational spring linkages and a second section running perpendicular to said first section.

11. A rotational vibration drive according to claim 10 in which said one of said slots has a third section which merges with said second section and which runs parallel to said first section.

12. A rotational vibration drive according to claim 7 in which one of the mutually-aligned holes in said first and second plates is a blind hole and one of the mutually-aligned holes in said second and third plates is a blind hole.

13. A rotational vibration drive according to claim 7 in which said third plate includes mountings for holding a supplementary mass.

* * * * *

UNITED STATES PATENT AND TRADEMARK OFFICE
CERTIFICATE OF CORRECTION

PATENT NO. : 4,650,331

DATED : March 17, 1987

INVENTOR(S) : RODLOFF, Rüdiger K. et al

It is certified that error appears in the above-identified patent and that said Letters Patent is hereby corrected as shown below:

On the Title Page:

The spelling of the name of the assignee of record is corrected to read as follows:

--Deutsche Forschungs- und Versuchsanstalt für Luft- und Raumfahrt e.V.--

Signed and Sealed this

Twenty-fifth Day of August, 1987

Attest:

DONALD J. QUIGG

Attesting Officer

Commissioner of Patents and Trademarks